United States Patent [19]
Takemoto

[11] Patent Number: 5,839,956
[45] Date of Patent: Nov. 24, 1998

[54] GAME PLAY MEDIA LENDING MACHINE AND GAMING HOUSE MANAGEMENT SYSTEM

[75] Inventor: Takatoshi Takemoto, Tokyo, Japan

[73] Assignee: Kabushiki Kaisha Ace Denken, Tokyo, Japan

[21] Appl. No.: 513,914
[22] PCT Filed: Mar. 7, 1994
[86] PCT No.: PCT/JP94/00356
    § 371 Date: Sep. 7, 1995
    § 102(e) Date: Sep. 7, 1995
[87] PCT Pub. No.: WO94/20179
    PCT Pub. Date: Sep. 15, 1994

[30] Foreign Application Priority Data

Mar. 9, 1993 [JP] Japan ................................. 5-047925

[51] Int. Cl.⁶ .................................................. G07F 17/34
[52] U.S. Cl. ................................ 463/25; 463/29; 463/20; 235/380
[58] Field of Search ................................. 463/29, 20, 25; 235/379, 380

[56] References Cited

U.S. PATENT DOCUMENTS 4,880,237  11/1989  Kishishita ............................ 463/29
5,546,523   8/1996  Gatto .................................. 395/156

FOREIGN PATENT DOCUMENTS

| A-606 454 | 2/1991 | Australia . |
| 2-4398    | 1/1990 | Japan . |
| 2-71780   | 3/1990 | Japan . |
| 4-157586  | 5/1992 | Japan . |
| 4-209085  | 7/1992 | Japan . |
| 4-256092  | 9/1992 | Japan . |
| WO-A-91 09369 | 6/1991 | WIPO . |

Primary Examiner—Benjamin H. Layno
Attorney, Agent, or Firm—Seed and Berry LLP

[57] ABSTRACT

In a game play media lending machine (20) of the invention, a control section (47) checks a player who uses a credit card for identification by comparing information read by a credit card reader (27) with information entered through an identification data input means (28). If they match and the player is identified as the credit card holder, game play media are dispensed to the player. When the lending amount for playing a game with the credit card is set, a lending card issuing section (43) issues a lending card such as a receipt on which the lending amount and the lending amount setting date and time are entered. Thus, the lending machine (20) performs all procedures concerning use of the credit card as well as dispensing the game play media.

13 Claims, 10 Drawing Sheets

GAME PLAY MEDIA LENDING MACHINE AND GAMING HOUSE MANAGEMENT SYSTEM

TECHNICAL FIELD

This invention relates to a game play media lending machine which enables the use of a credit card for lending game play media.

TECHNICAL BACKGROUND

Generally, in gaming houses such as pachinko ball (Japanese pinball) parlors, players use cash, prepaid cards, house cards, etc., to borrow game play media, such as pachinko balls, medals, or coins, for playing games; credit cards cannot be used for this purpose.

Thus, it is inconvenient for players who want to use credit cards, and lending machines which also allow the use of a credit card for lending game play media have been in demand.

The applicant has already proposed a system with which a credit card can also be used in Japanese Patent Application No. Hei 3-270650. The system provides a game play media lending machine to which a credit card entered in a theft prevention pack is attached for also allowing use of the credit card for lending game play media. A specific electromagnetic wave is output from the pack and facilities like gates for detecting the electromagnetic wave from the pack are installed at the entrance and exit of the gaming house for preventing the pack from being removed from the gaming house.

Troublesomely, the system requires that the player should bring the pack discharged from the gaming machine to a counter for receiving his or her credit card returned from the gaming house even if the player loses a game. Further, troublesomely, personnel in the gaming house must again set the packs collected at the counter in gaming machines. Since gates must be installed at the entrance and exit of the gaming house, funds for investment in equipment are also required.

DISCLOSURE OF INVENTION

It is therefore an object of the invention to provide a game play media lending machine which enables a player to use a credit card for lending game play media, eliminates the needs for the player to go to a counter as part of a procedure for using the credit card and for personnel in a gaming house to perform an extra job involved, and does not require gates at the entrance and exit of the gaming house.

To these ends, according to the invention, there is provided a game play media lending machine which enables a player to use a credit card for lending game play media, comprising:

means for dispensing game play media;

a credit card reader for reading information registered on a credit card containing identification data;

identification information input means for inputting identification information to be compared with the identification data;

amount setting means for setting a lending amount of money to be spent by a player playing a game using an inserted credit card;

control means for determining whether or not the identification information input through the identification information input means matches the identification data read by the credit card reader, and if they match, the control means causing the game play media dispensing means to dispense game play media within the range of the lending amount set through the amount setting means;

means for storing the credit card identification information and the lending amount; and means for issuing a lending card on which at least the lending amount is entered when the lending amount is set through the amount setting means.

Thus, a credit card can be used to lend game play media for a player to play a game without providing any device for preventing the player from removing game play media to the outside of the gaming house.

The game play media lending machine can further include means for transmitting the identification information and the lending amount stored in the storage means to a predetermined specific information processor.

Thus, the identification information and the lending amount can be transmitted to a credit data totalizer for totalizing credit data.

The identification data can be a personal identification number and the identification information input means can be a key switch.

Thus, the player can use the key switch to enter his or her personal identification number for identification as the credit card holder.

The identification data can be feature information indicating features of a player who holds a credit card in numbers and the identification information input means can be means for extracting the feature information of the player.

Thus, the player can be identified as the credit card holder according to the feature information of the player.

Further, the feature information of the identification data can have information on a fingerprint, the identification information input means can be means for extracting a fingerprint of the player, and the control means can have means for comparing the extracted fingerprint with a fingerprint specified by information contained in the credit card.

Thus, the player can be identified as the credit card holder according to the fingerprint of the player.

The game play media lending machine can further include:

means for storing a plurality of adjustment card type recording media for registering a return amount not spent for lending game play media among the input amount of money and the number of won game play media; and an issuing machine for taking out the adjustment card type recording media one at a time from the storage means, registering the return amount and the number of won game play media on the adjustment card type recording medium, and issuing it.

Thus, the return amount and the number of won game play media can also be registered on the adjustment card type recording medium.

The issuing machine can further include an adjustment card type recording medium reader for accepting an inserted adjustment card type recording medium, reading the return amount and the number of won game play media registered on the adjustment card type recording medium, and outputting them to the control means.

Thus, the adjustment card type recording media can be used to lend game play media for a player to play a game.

Further, according to the invention, there is provided a gaming house management system for managing a gaming house having a plurality of gaming machines for playing games with game play media and a plurality of game play media lending machines for lending the game play media, the system comprising:

a credit data totalizer for totalizing credit data, each of the game play media lending machines comprising:

means for dispensing game play media;

a credit card slot;

a credit card reader for reading information registered on a credit card inserted into the credit card slot containing identification data;

identification information input means for inputting identification information to be compared with the identification data;

amount setting means for setting a lending amount of money for the player to play a game with the inserted credit card;

control means for causing the game play media dispensing means to dispense game play media within the range of the lending amount set through the amount setting means, provided that the identification information input through the identification information input means matches the identification data read by the credit card reader;

means for storing the credit card identification information and the lending amount;

means for transmitting the credit card identification information and the lending amount stored in the storage means to the credit data totalizer; and means for issuing a lending card on which at least the lending amount is entered when the lending amount is set through the amount setting means, the credit data totalizer for totalizing the lending amount and the identification information for each credit card holder and outputting the result as gaming house data.

Thus, the gaming house management system enables players to use credit cards for playing games.

BEST MODE FOR CARRYING OUT THE INVENTION

Referring now to the accompanying drawings, there is shown a preferred embodiment of the invention.

Figure 1:
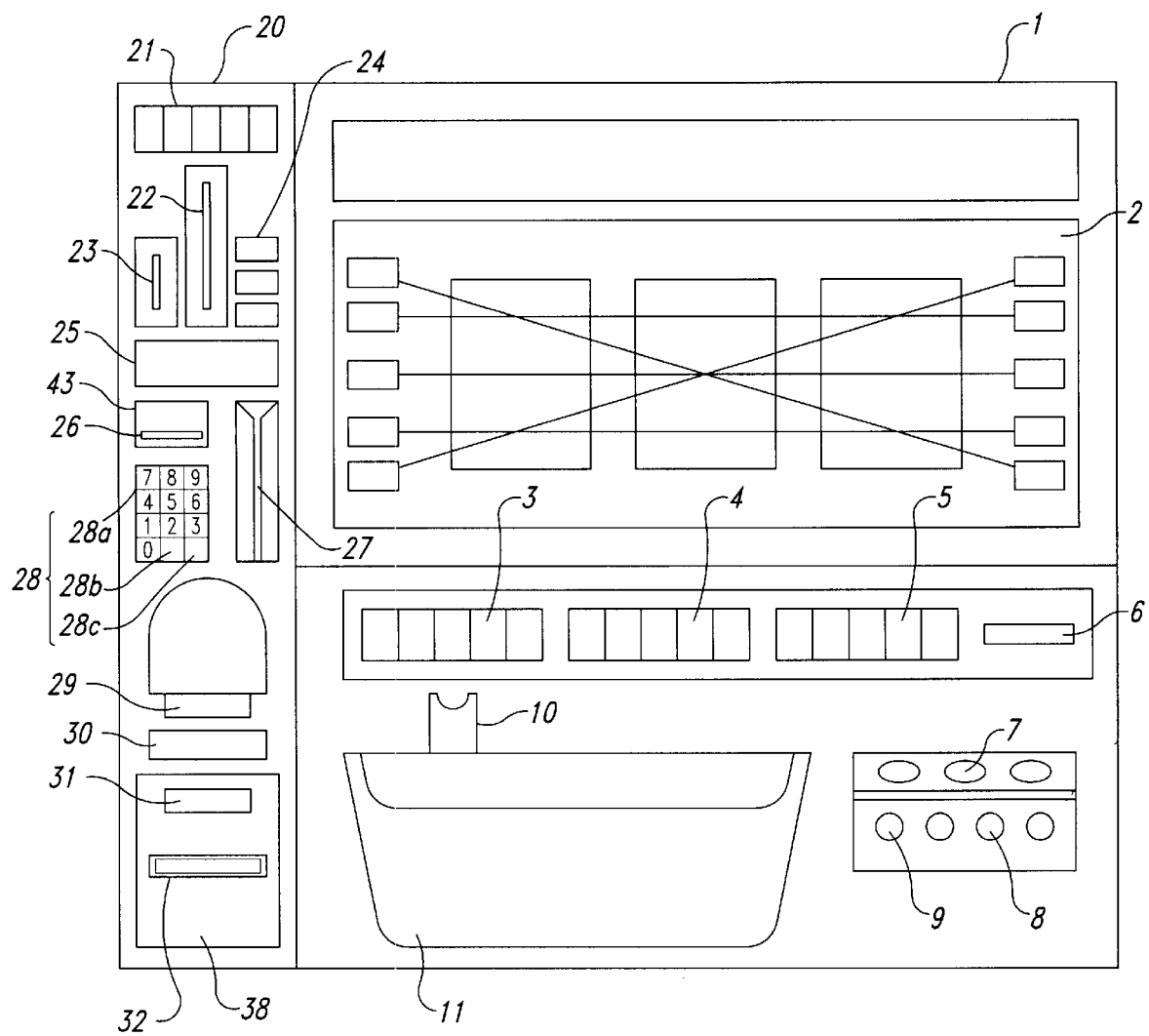
FIG. 1 is a front view showing one embodiment of the invention.

A game play media lending machine 20 of the invention is attached to the side of a gaming machine 1, as shown in FIG. 1. It has a front panel face provided with an amount display 21, a bill slot 22, a coin slot 23, lending setting switches 24, a message display panel 25, a lending card (receipt) outlet 26, a credit card reader 27, key switches 28, a game play media dispensing port 29, a coin return 30, an adjustment switch 31, and an adjustment card recording medium (house card) slot 32. The key switches 28 are used for identification data input means and amount setting means.

Figure 2:
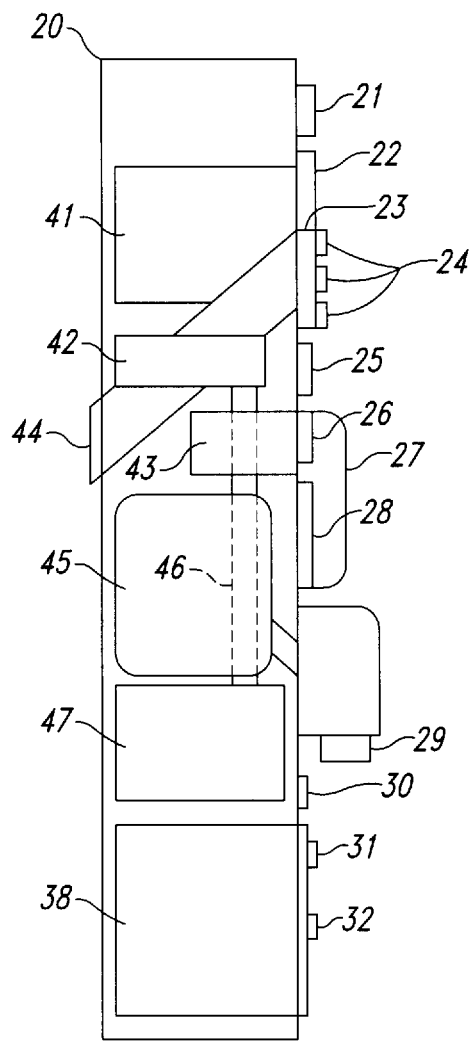
FIG. 2 is a side view showing the embodiment of the invention.

As shown in FIG. 2, the game play media lending machine 20 contains a bill validator 41, a coin selector 42, a receipt issuing machine 43 functioning as lending card issuing means, a coin inlet 44, a game play media dispensing counter 45 functioning as a part of a game play media dispensing mechanism, a coin return passage 46, a CPU control board 47 functioning as control means, and a house card reader/writer 38.

As shown in FIG. 1, the gaming machine 1 (in this case, a slot machine) comprises a number-of-taken-in-media display 3, a dispensing signal display 4, a taking-in signal display 5, an adjustment switch 6, game selection switches 7, a game control switch 8, a start switch 9, a game play media slot 10, and a game play media return 11 below a game board 2.

Figure 8:
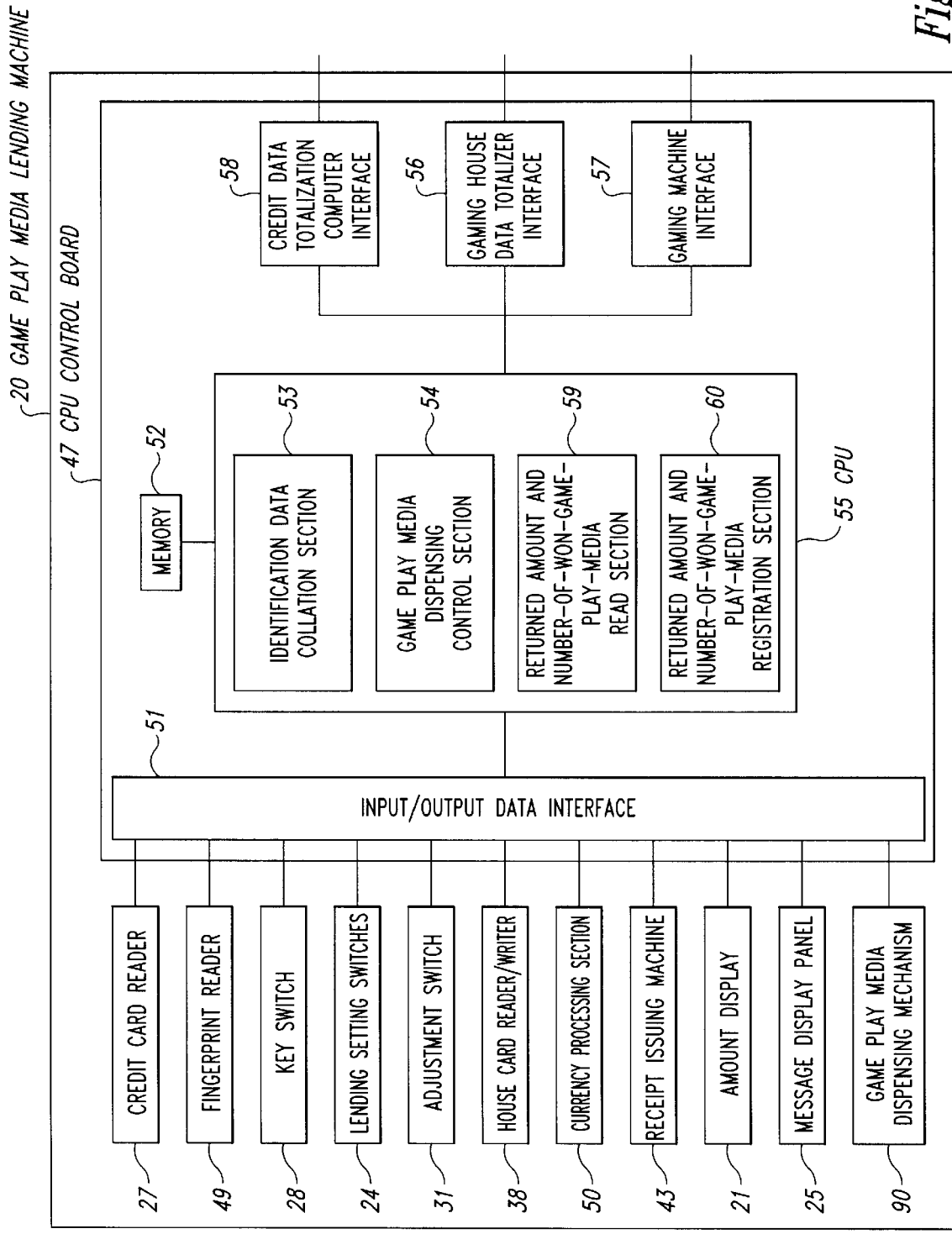
FIG. 8 is a block diagram showing a game play media lending machine according to the embodiment of the invention.

FIG. 8 is a functional block diagram of the game play media lending machine 20. It shows functional blocks centering on blocks concerning credit cards and house cards. An input/output interface 51, a memory 52, a CPU 55, a credit data totalization computer interface 58, a gaming house data totalizer interface 56, and a gaming house interface 57 are placed on the CPU control board 47. The CPU 55 contains an identification data collation section 53, a game play media dispensing control section 54, a returned amount and number-of-won-game-play-media read section 59, and a returned amount and number-of-won-game-play-media registration section 60.

The lending setting switches 24, a ten-key pad 28a, the credit card reader 27, the adjustment switch 31, the house card reader/writer 38, a fingerprint reader 49, and a currency processing section 50 are connected via the input/output interface 51. Also, the amount display 21, the message display panel 25, and the receipt issuing machine 43 are connected. Further, a game play media dispensing mechanism 90 is connected.

Figure 10:
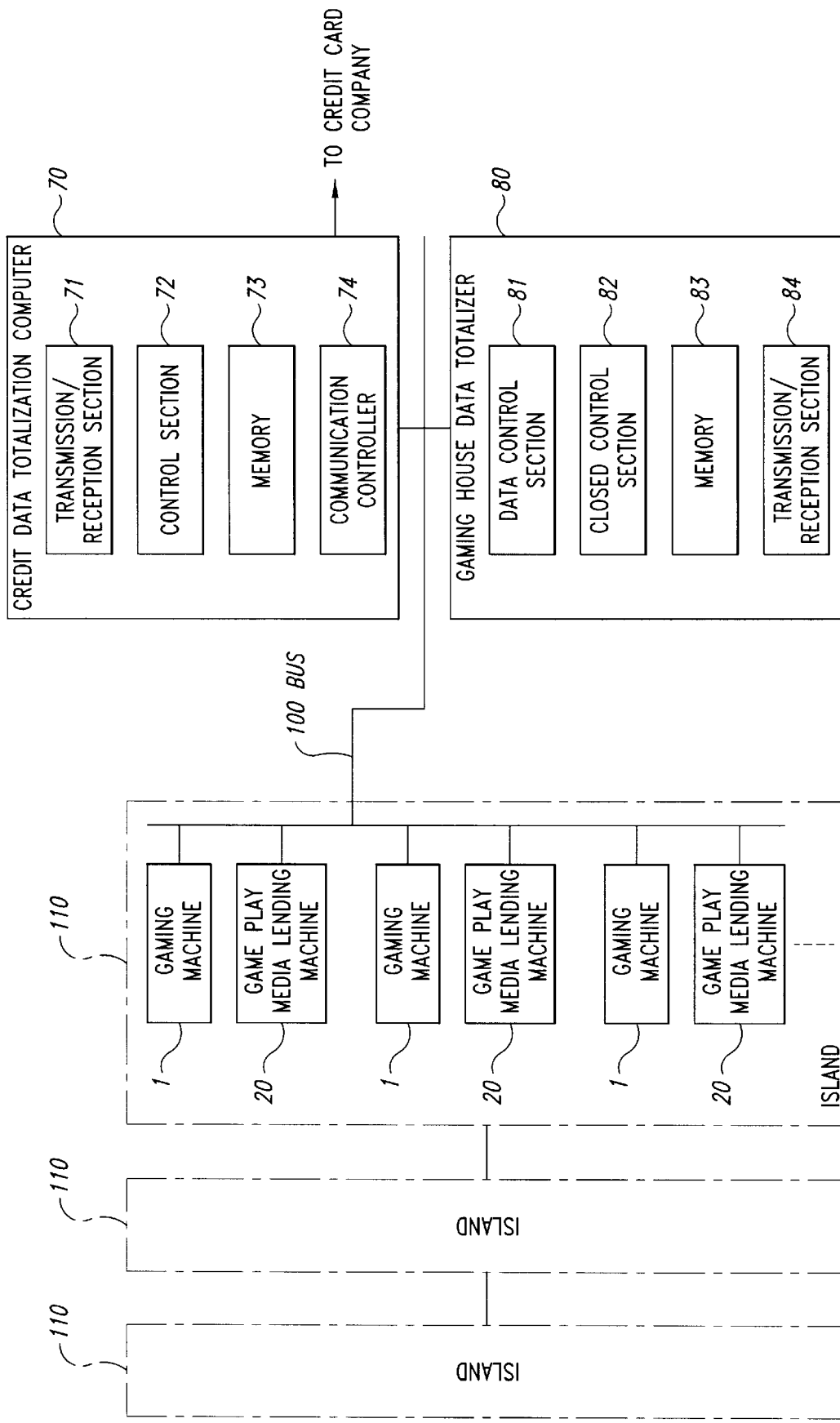
FIG. 10 is a block diagram showing the bus connection relationships among gaming machines, game play media lending machines, a credit data totalization computer, and a gaming house data totalizer according to the embodiment of the invention.

FIG. 10 shows the bus connection relationships among the gaming machines, the game play media lending machines, the credit data totalization computer, and the gaming house data totalizer in the gaming house. The credit data totalization computer 70 contains a transmission/reception section 71, a control section 72, a memory 73, and a communication controller 74. The gaming house data totalizer 80 contains a data control section 81, a closed control section 82, a memory 83, and a transmission/reception section 84. An island 110 is made up of a set of the gaming machines 1 and game play media lending machines 20. A plurality of islands 110, the credit data totalization computer 70, and the gaming house data totalizer 80 are connected by a bus 100.

The credit card reader 27 is, in this case, of the slide type appropriate to magnetic cards. When a credit card is slid at a given speed with its magnetic recording face set to a detection face of the reader, the credit card reader 27 can read information registered on the credit card and transmit it to the CPU control board 47; it functions as a credit card reader of the invention. The credit card reader 27 may be simply formed as an opening at the bottom of which a magnetic card reader may be disposed.

The key switches 28 consist of the ten-key pad 28a of digits 1–9, an illuminated check switch 28b, and a cancel switch 28c. The key switches 28 are used to input personal identification numbers, etc., to the CPU control board 47, which contains the identification data collation section 53 (see FIG. 8) for checking the personal identification numbers, etc. In this case, the key switches 28 function as the identification data input means and the amount setting means of the invention.

The bill validator 41 determines the denomination, validity, etc., of a bill inserted through the bill slot 22 and transmits the data to the CPU control board 47. The coin selector 42 determines the denomination, validity, etc., of a coin inserted through the coin slot 23 and transmits the data to the CPU control board 47; it has a function of selectively delivering counterfeit coins to be rejected to the coin return passage 46 and valid coins to the coin inlet 44. The bill validator 41 and the coin selector 42 are collectively named the currency processing section 50 (see FIG. 8).

The receipt issuing machine 43 issues a receipt used as a lending card for lending game play media with a credit card under the control of the CPU control board 47. The game play media dispensing mechanism 90 counts game play media using the game play media dispensing counter 45 and dispenses game play media to be lent to players to the game play media dispensing port 29 under the control of the game play media dispensing control section 54.

The CPU control board 47 controls the entire operation of the game play media lending machine 20, as described below. Particularly when a credit card is used, the identification data collation section 53 (see FIG. 8) determines whether or not the personal identification number entered through the key switches 28 matches the personal identification numbercard read by the credit card reader 27. Only when they match, does a registered operation program operate the game play media dispensing counter 45 and cause the game play media dispensing control section 54 (see FIG. 8) to dispense game play media within the range of the amount for lending game play media, set by the player pressing the lending setting switches 24.

The lending setting switches 24 are key switches each corresponding to each denomination so that players can set several denominations, such as 500 yen, 1000 yen, and 5000 yen. These key switches can be made illuminated switches for presenting key switches corresponding to denominations that can be set with hard currency or a credit card.

The house card reader/writer 38 reads or writes registration information of a so-called adjustment card made of, for example, a magnetic card, and operates under the control of the CPU control board 47. Specifically, the operation is performed by the returned amount and number-of-won-game-play-media read section 59 and the returned amount and number-of-won-game-play-media registration section 60.

The game play media dispensing mechanism 90 has at least the game play media dispensing counter 45 and the game play media dispensing port 29. While counting the number of game play media by the game play media dispensing counter 45, the game play media dispensing mechanism 90 dispenses game play media to the game play media dispensing port 29.

Next, the operation will be discussed.

First, the game play media dispensing operation will be described. Unless otherwise specified in the description to follow, the operation of the components is performed under the control of the CPU control board 47.

When a player inserts a bill into the bill slot 22, the inserted bill is brought into the inside of the bill validator 41 for determining the validity of the bill. If the bill is determined to be valid, the amount (denomination) of the bill is displayed on the amount display 21, and the bill is taken in. The taken-in bill is stored in the game play media lending machine 20 or is sent out to the outside of the lending machine 20 and is collected at one place such as one end of the gaming machine island by an external bill transporter (not shown) under the control of a gaming machine island controller etc. (not shown). If the bill is determined to be invalid, the bill validator 41 rejects it back to the bill slot 22.

When the bill determined to be valid is taken in, the input amount is displayed on the amount display 21, then the lending machine 20 waits for the player to set the amount for lending game play media by pressing the lending setting switches 24. When the player handles the lending setting switches 24, as many game play media as selected are dispensed by the game play media dispensing counter 45 to the inside of the game play media dispensing port 29 and stored therein. At that time, the amount equivalent to the number of the dispensed game play media is subtracted from the amount display and the result is displayed on the amount display.

In this condition, if the player places his or her hands, a box, a paper cup, or the like under the game play media dispensing port 29 and opens its gate, the game play media in the game play media dispensing port 29 fall into the hands, box, paper cup, or the like. If a coin is inserted into the coin slot 23, game play media are dispensed by the operation of the coin selector 42, etc., in a similar sequence to that of the game play media dispensing process when a bill is inserted as described above. When both a bill and a coin are inserted, game play media are dispensed in a similar manner.

Figure 7A:
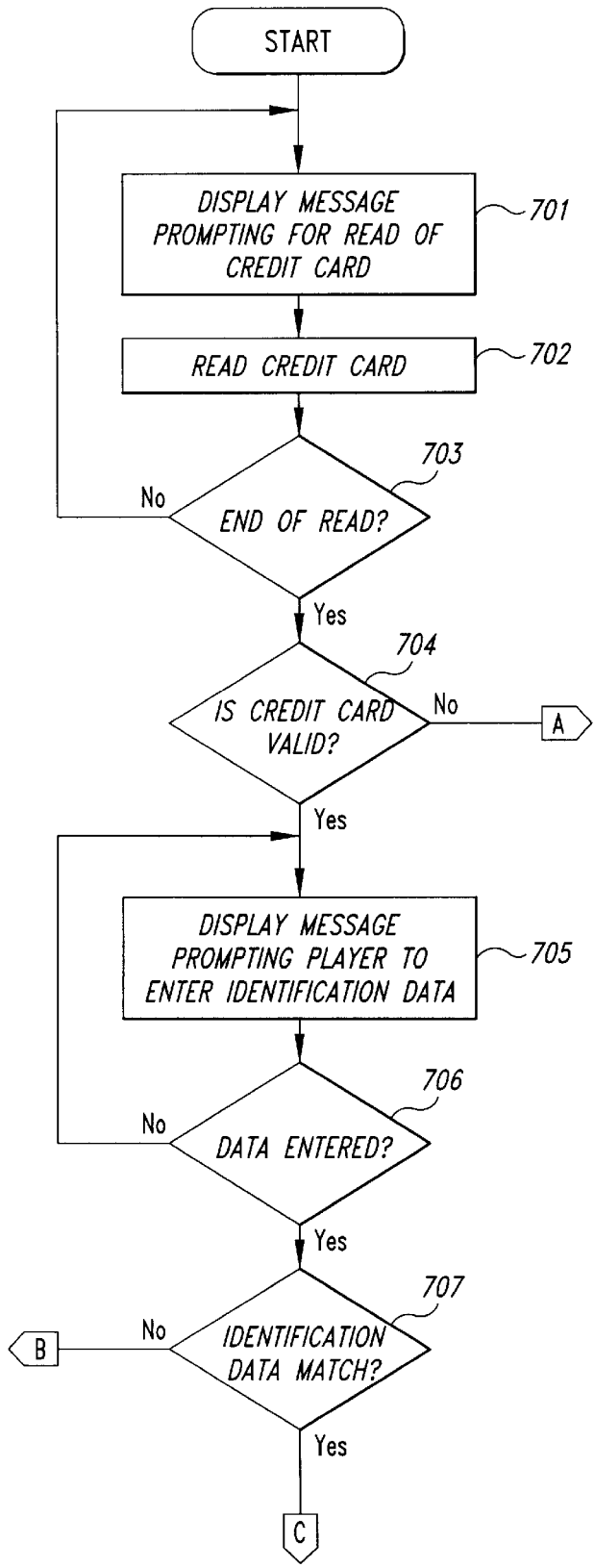
FIGS. 7A, 7B, and 7C are a flowchart showing the operation in the embodiment of the invention.
Figure 7B:
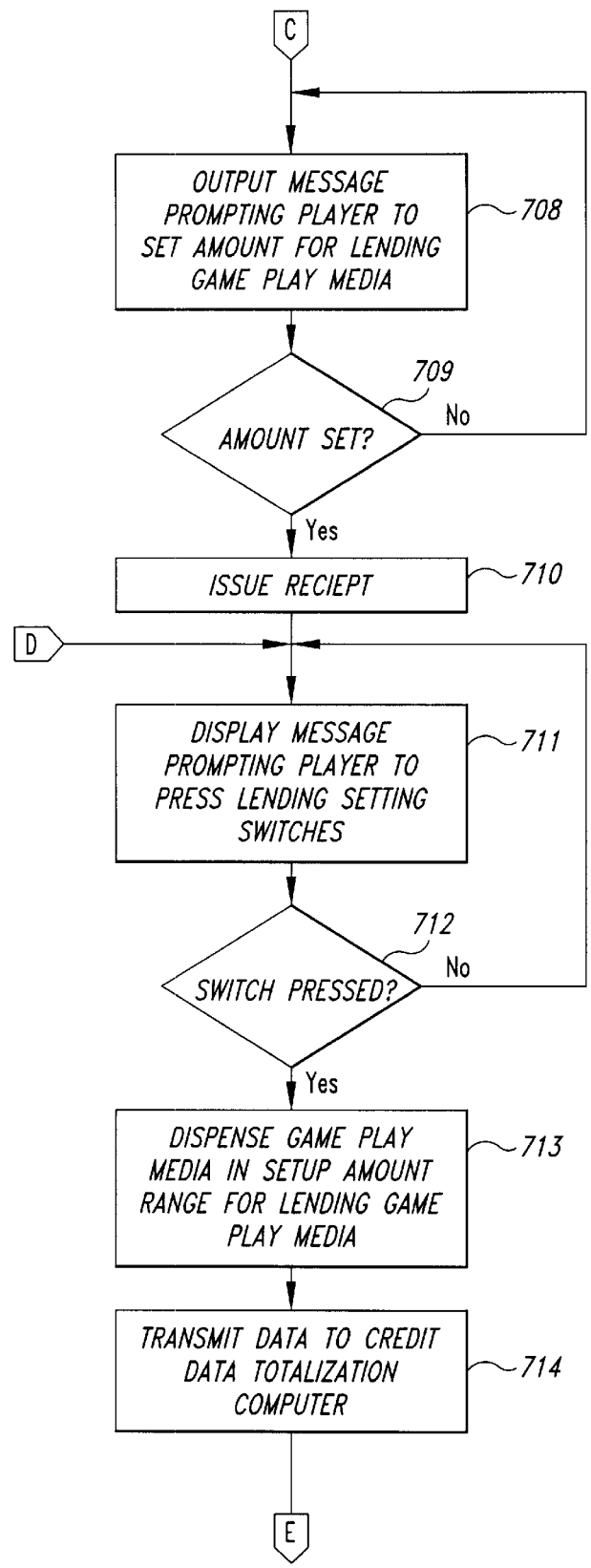
Figure 7C:
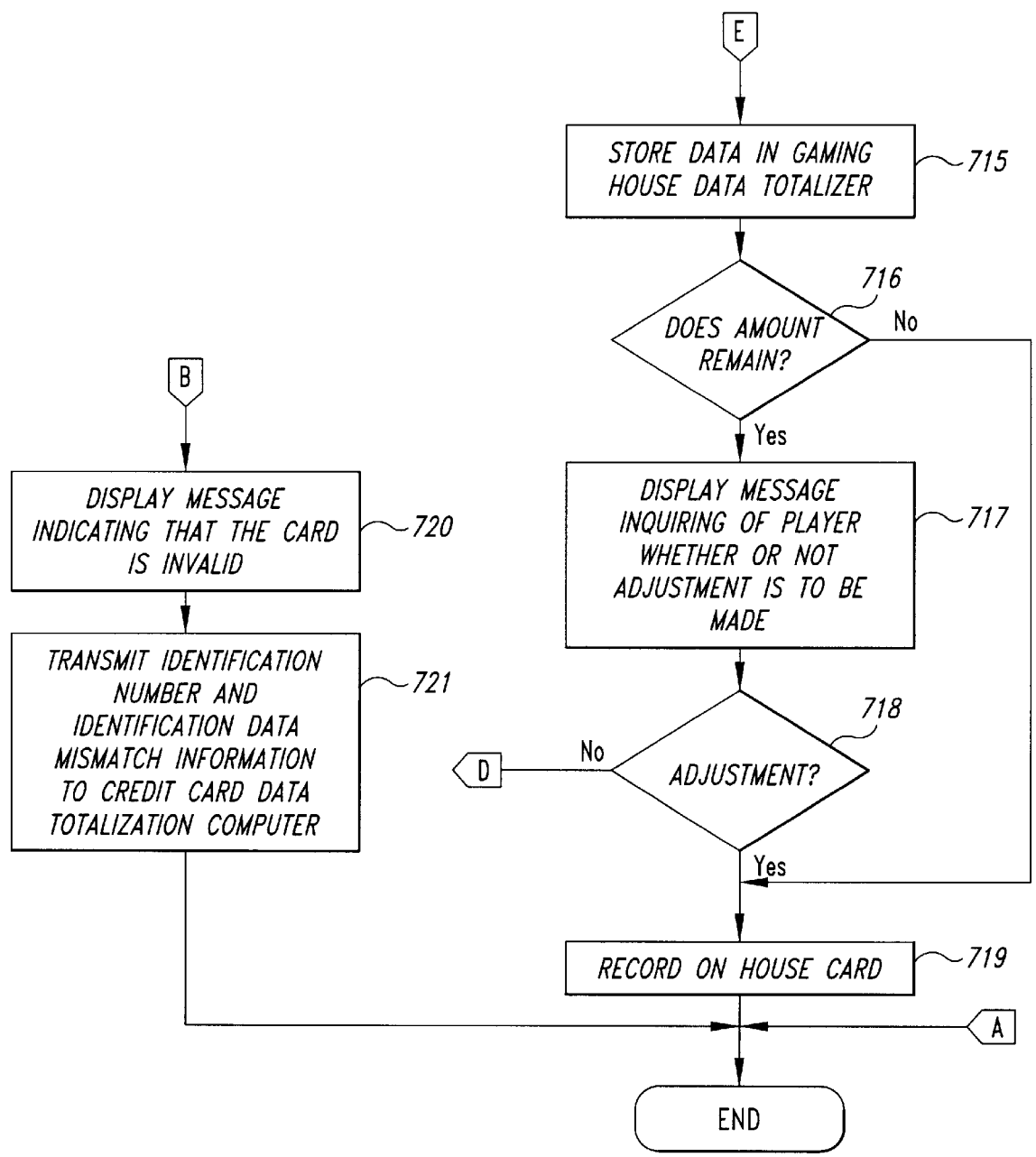

A process performed when a player does not have cash and uses a credit card for playing a game will be discussed with reference to FIGS. 7A, 7B, and 7C.

First, a message prompting for the reading in of a credit card is displayed at step 701. When the player places his or her credit card on the credit card reader 27 and slides it, the credit card reader 27 reads registration information of the credit card and the CPU control board 47 stores the information in the internal memory at step 702.

The game play media lending machine 20 determines whether or not reading of the credit card ends at step 703. If it is not determined that the reading ends, control returns to step 701 at which the message prompting for reading in of a credit card is displayed on the message display panel 25.

If it is determined that the reading ends, whether or not the read credit card is valid is determined. For this purpose, whether or not a mismatch in the identification data (described below) has occurred a predetermined number of times or more is determined. If the credit card is determined to be invalid, the process is terminated. If the credit card is determined to be valid, control advances to step 705.

At step 705, a message prompting the player to enter identification data is displayed on the message display panel 25. Next, at step 706, whether or not the identification data is entered is determined, and if the identification data is not entered, control returns to step 705. If the identification data is entered, control advances to step 707. To enter the identification data, for example, the player inputs the personal identification number of the credit card by pressing the key switches 28.

At step 707, whether or not the identification data read from the credit card matches the identification data entered by the player is determined. For example, the personal identification number read from the credit card is compared with the personal identification number entered by the player for the determination.

If it is not determined at step 707 that the two identification data entries match, control advances to step 720 at which a message of "USE OF THIS CARD IS NOT ALLOWED" is displayed on the message display panel 25. After this, identification data mismatch information, identification number, years months days, hours minutes, and credit card company name are transmitted to the credit data totalization computer at step 721 and the process is terminated. If the identification data mismatch information is cleared, for example, once a day in the credit data totalization computer, when an identification data mismatch has occurred a predetermined number of times or more in a day, the credit card becomes invalid. In the gaming house, the credit card becomes unavailable at least for that day. This prevents illegal use of the credit card.

If it is determined at step 707 that the identification data entries match, a message prompting the player to set the amount for lending game play media is displayed on the message display panel 25 at step 708.

Next, at step 709, whether or not the amount for lending game play media is set is determined. If it is not determined that the amount is set, control returns to step 708 at which a message prompting the player to set the amount for lending game play media is displayed on the message display panel 25. The player can set the amount by setting the amount with the ten-key pad 28a and then pressing the illuminated check switch 28b. If it is determined at step 709 that the amount has been set, the amount for lending game play media is displayed on the amount display 21, then control advances to step 710 at which a receipt on which entries of the gaming house name, date and time, spent amount, etc., are made is issued. In this case, this receipt is passed to the player and it can be decided that the player approves his or her specified amount by the fact that he or she receives the receipt. Therefore, trouble in setting the amount for lending game play media can be prevented. For the player to receive the receipt, it may be output to a position at which the player can receive the receipt, provided that the illuminated check switch 28b is pressed. This would ensure the player's approval procedure.

Next, a message prompting the player to press the lending setting switches is displayed at step 711. The lending setting switches are illuminated switches; the lending setting switches corresponding to the amount within the lending amount range are illuminated.

Further, whether or not any of the lending setting switches are pressed is determined at step 712. If it is not determined that the switch is pressed, control returns to step 711. If it is determined that the switch has been pressed, game play media are dispensed in the setup amount range for lending game play media at step 713. At that time, the amount set at step 712 is subtracted from the amount set at step 709 and the result is displayed on the amount display 21 as the remaining amount.

The identification number, years months days, hours minutes, credit card company name, and setup amount for lending game play media are transmitted to the credit data totalization computer 70 in FIG. 10 at step 714. The gaming machine number and the amount set at step 712 are stored in the gaming house data totalizer memory 83 in FIG. 10.

Next, whether or not the amount remains is determined at step 716. If it is not determined that the amount remains, the remaining amount (0 yen) and the number of won game play media are recorded on a house card at step 719, and the process is terminated. If it is determined that the amount remains, a message inquiring of the player whether or not adjustment is to be made is displayed at step 717. Whether or not adjustment is to be made is determined at step 718. If it is determined that adjustment is made, the remaining amount and the number of won game play media are recorded on a house card at step 719, and the process is terminated. If it is not determined that adjustment is made, control returns to step 711 at which a message prompting the player to press the lending setting switches is displayed.

When the remaining amount displayed on the amount display 21 reaches zero, if the player again inserts cash or uses a credit card for displaying an amount on the amount display, again game play media can be dispensed in a similar manner.

If the credit data totalization computer 70 and the computers of the credit card companies are connected on-line, immediate inquiry can be made. To collect cash, accounts for each player are prepared by the credit data totalization computer 70 and supplied to the credit card companies.

As shown in FIG. 10, a signal for each of the game play media lending machines 20 and the gaming machines 1 is input to the gaming house data totalizer 80, which then performs an operation on the signal using the data control section 81, stores the result in the memory 83, and outputs a specific signal to each game play media lending machine 20 and gaming machine 1.

For example, if the player starts a game by inserting a bill or coin, the CPU control board 47 stores data of the inserted amount in the internal memory 52 in FIG. 8 and sends the data to the gaming house data totalizer 80 as a cash receipt via the gaming house data totalizer interface 56 in FIG. 8. On the other hand, if the player starts a game with a credit card, the CPU control board 47 stores, in the internal memory 52, data of the amount for lending game play media and sends the data to the credit data totalization computer 70 as a credit card income. The CPU control board 47 stores, in the internal memory, data of the spent amount set by pressing the lending setting switches 24 and sends the data to the gaming house data totalizer 80 as an actual income.

Next, the gaming operation will be discussed.

The gaming machine 1 performs the operation of taking a predetermined number of game play media inside the gaming machine 1 for a player to play a game. The CPU control board 47 of the game play media lending machine 20 stores a signal representing the number of taken-in game play media at that time and outputs the signal to the gaming house data totalizer 80 as a "taken-in media signal." If the player plays a game with the taken-in game play media and as a result, game play media are paid out to the player as a prize, the CPU control board 47 stores the current signal and outputs it to the gaming house data totalizer 80 as a "dispensing signal."

The closed control section 82 of the gaming house data totalizer 80 subtracts the "taken-in medal signal" from the "dispensing signal." When the result reaches the preset "closed setup number," the closed control section 82 outputs a closed signal for stopping the gaming machine operation to the gaming machine 1 via the CPU control board 47 of the game play media lending machine 20, whereby the gaming machine 1 stops, disabling the player from continuing game play. At that time, a message of "CLOSED" meaning that "since a predetermined number of game play media have been paid out from this gaming machine, new game play will stop for a while" is displayed on the gaming machine 1, and the occurrence of a closed gaming machine is stored in the memory 52 of the CPU control board 47.

The CPU control board 47 may subtract the "taken-in medal signal" from the "dispensing signal," give a gaming machine closing instruction directly to the gaming machine 1, and send a signal indicating occurrence of a closed gaming machine to the gaming house data totalizer 80.

To release the closed gaming machine condition, personnel in the gaming house can specify the number of the gaming machine 1 from the gaming house data totalizer and operate a closed condition release switch. Alternatively, a timer may be built-in for automatically releasing the closed condition in a given time after the closed condition occurs. The timer may be located in any of the gaming machine 1, the game play media lending machine 20, and the gaming house data totalizer 80. The time is set at the gaming house data totalizer 80. The closed number of game play media can be set at the gaming house data totalizer 80. It can also be specially set in the game play media lending machine 20.

This description assumes that the gaming machine is closed when "dispensing signal—taken-in medal signal≈closed setup number" holds. However, in this calculation expression, the number of game play media paid out to the player for winning game plays when the gaming machine is closed varies depending on how the preceding player won or lost games, thus a problem arises in a sense of determining the maximum number of dispensed game play media for one player. When the closed setup number of game play media is 3000, if the preceding player won 1000 game play media and a new player wins games and satisfies the calculation expression closing the gaming machine, then the player has 3000–1000=2000 game play media. In contrast, if the preceding player lost 1000 game play media and a new player wins games closing the gaming machine, then the player has 3000 +1000=4000 game play media. The difference between them becomes no less than 2000.

To eliminate this problem, for example, the following calculation method of the number of game play media of a player may be adopted: The expression "the number of game play media of player=number of lent game play media—taken-in medal signal+dispensing signal" is used. If the gaming machine is closed when "the number of game play media of player—closed setup number of game play media" holds, the number of game play media of the player when the gaming machine is closed can be set to a value extremely close to the closed setup number. Of course, the gaming house can be administered without setting the closed setup value.

Next, a process at time of game end will be discussed.

When a player wins a game and receives game play media, he or she shifts the game play media to a box or the like and brings it to a predetermined place where the game play media are counted for exchanging the game play media for a prize or money.

Alternatively, when the adjustment switch 6 attached to either or both of the gaming machine 1 and the game play media lending machine 20 is operated, the game play media paid out to the game play media return 11 of the gaming machine 1 for winning game plays are taken into the gaming machine 1 while they are counted, and after the counting ends, a house card preset in the game play media lending machine 20 (preset in a house card storage 65 in FIG. 9) is dispensed through the house card slot 32 via a call roller 64 and card feed rollers 62.

Figure 3:
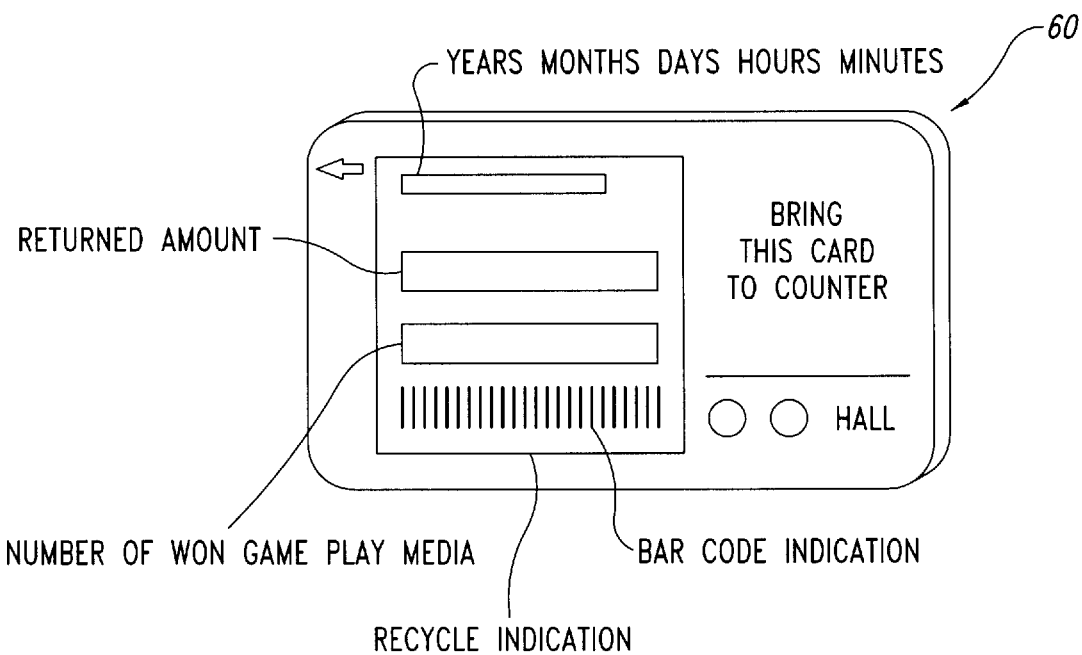
FIG. 3 is an illustration showing one example of an adjustment card type recording medium in the embodiment of the invention.
Figure 4:
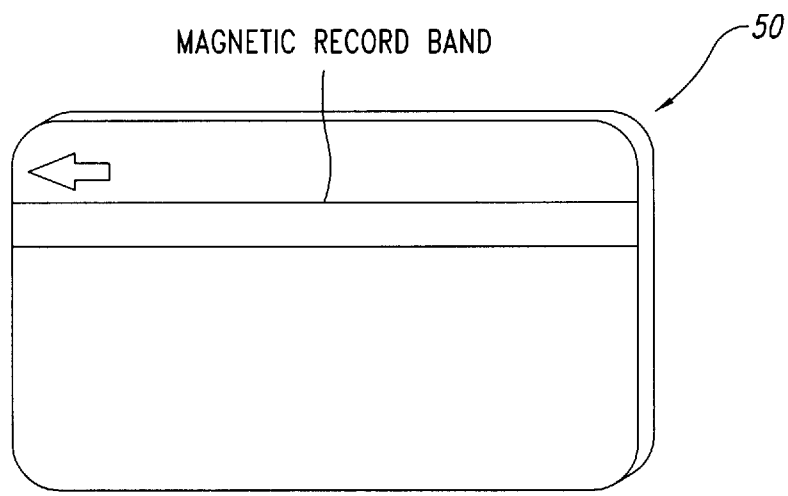
FIG. 4 is an illustration showing another example of an adjustment card type recording medium in the embodiment of the invention.
Figure 9:
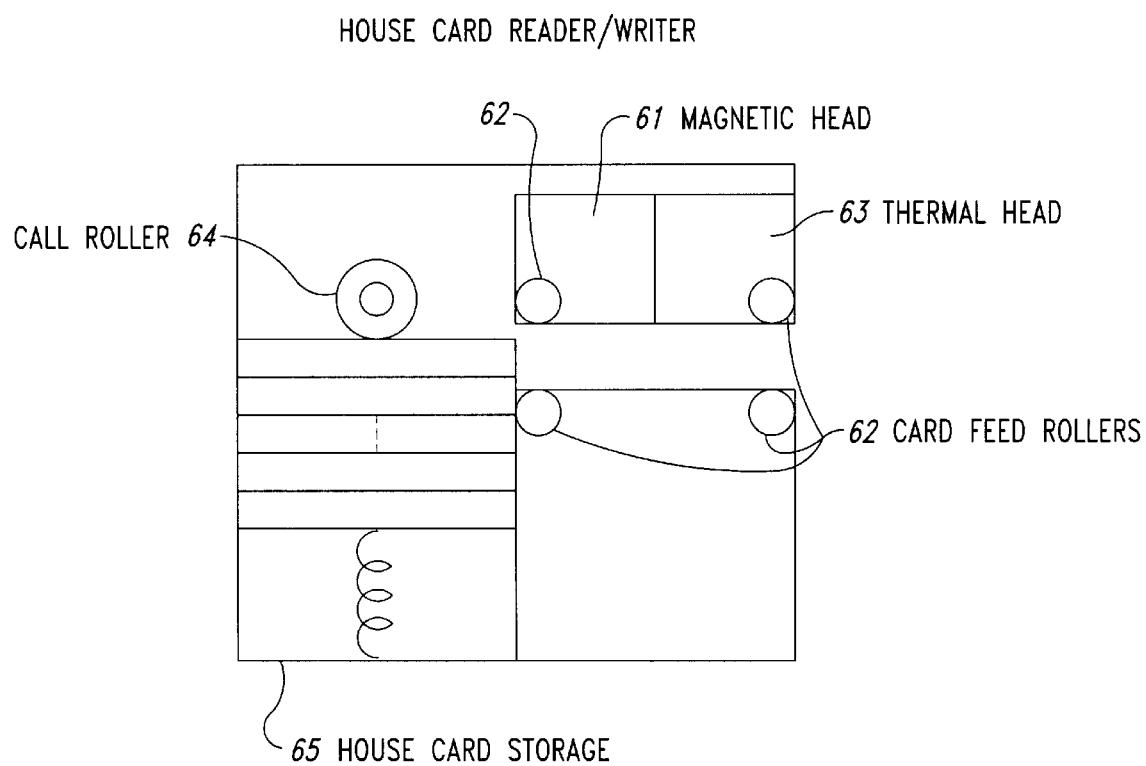
FIG. 9 is an illustration showing the configuration of an adjustment card type recording medium reader/writer according to the embodiment of the invention.

Entered on the house card are "number of won game play media," "amount" displayed on the amount display 21, and security information in addition to "gaming house name" and "date (years months days)." The entries can be made in the card by using a magnetic head 61 shown in FIG. 9 to provide a magnetic card 50 shown in FIG. 4. Alternatively, a recyclable card 60 that can be repeatedly used (shown in FIG. 3) can also be used. Characters, symbols, a bar code, and the like are recorded on the card by a thermal head 63 in FIG. 9 at a specific temperature, and the card is paid out to the player in such a condition that he or she can see the data recorded on the card. After the card is exchanged for a prize at a prize exchange window or counter, if heat at another specific temperature is applied to the card, the current characters, symbols, bar code, and the like recorded on the card disappear. A bar code is recorded on the recycle card so that it can be automatically read by a machine. Both bar code recording and magnetic recording may also be used for providing more powerful security.

When the card is paid out or dispensed, the number of won game play media and the amount on the amount display are also cleared. When the player brings the dispensed card to a predetermined adjustment counter and inserts the card into an adjustment device on the counter, the card contents including the security information are automatically read magnetically or according to the bar code, and the change and the number of game play media are displayed. The person in charge may count manually or with a counter according to the display for giving the change and a prize corresponding to the number of game play media to the player or at the same time as the display appears, a signal may cause a change dispenser and a prize dispenser to operate for automatic handling.

For the prize, if the game play media are coins, the amount of money including bills corresponding to the number of coins is paid out to the player. If the player, to whom the card is already paid out, wants to again play a game at another gaming machine, he or she can use the card to play a new game. When the player inserts the card into the house card slot 32, the magnetic or bar code record is read. If a change exists, the change amount is displayed and the number of game play media is also displayed.

The display enables the player to play a game as in the preceding games. After the game ends, when the player again presses the adjustment switch 6, new contents are rewritten onto the card inserted by the player and again the card is paid out to the player through the house card slot 32. If the house card is of magnetic type, the entered data is erased and new data is rewritten onto the card by the magnetic head 61. If the house card is a recycle card, heat is applied to the write portion on the card surface by the thermal head 63 or drum heated to an erasion temperature for erasing the entered data, then new data is rewritten onto the card by the thermal head 63 heated to a predetermined write temperature. If the card adopts both magnetic and recycle systems, both the treatments are executed for writing new data onto the card and the card is paid out to the player.

Thus, the game play media lending machine 20 performs all procedures concerning use of a credit card as well as dispensing game play media; it is convenient for both players and personnel in the gaming house because they need not execute any extra procedures for use of a credit card.

Figure 5:
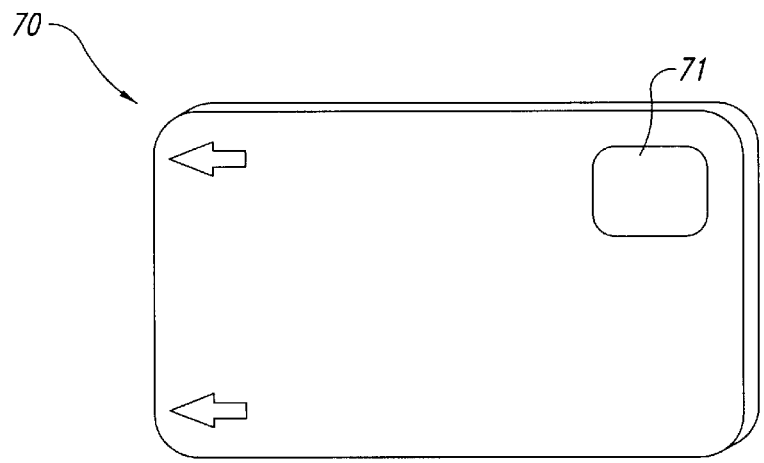
FIG. 5 is an illustration showing a credit card in a modified embodiment of the invention.
Figure 6:
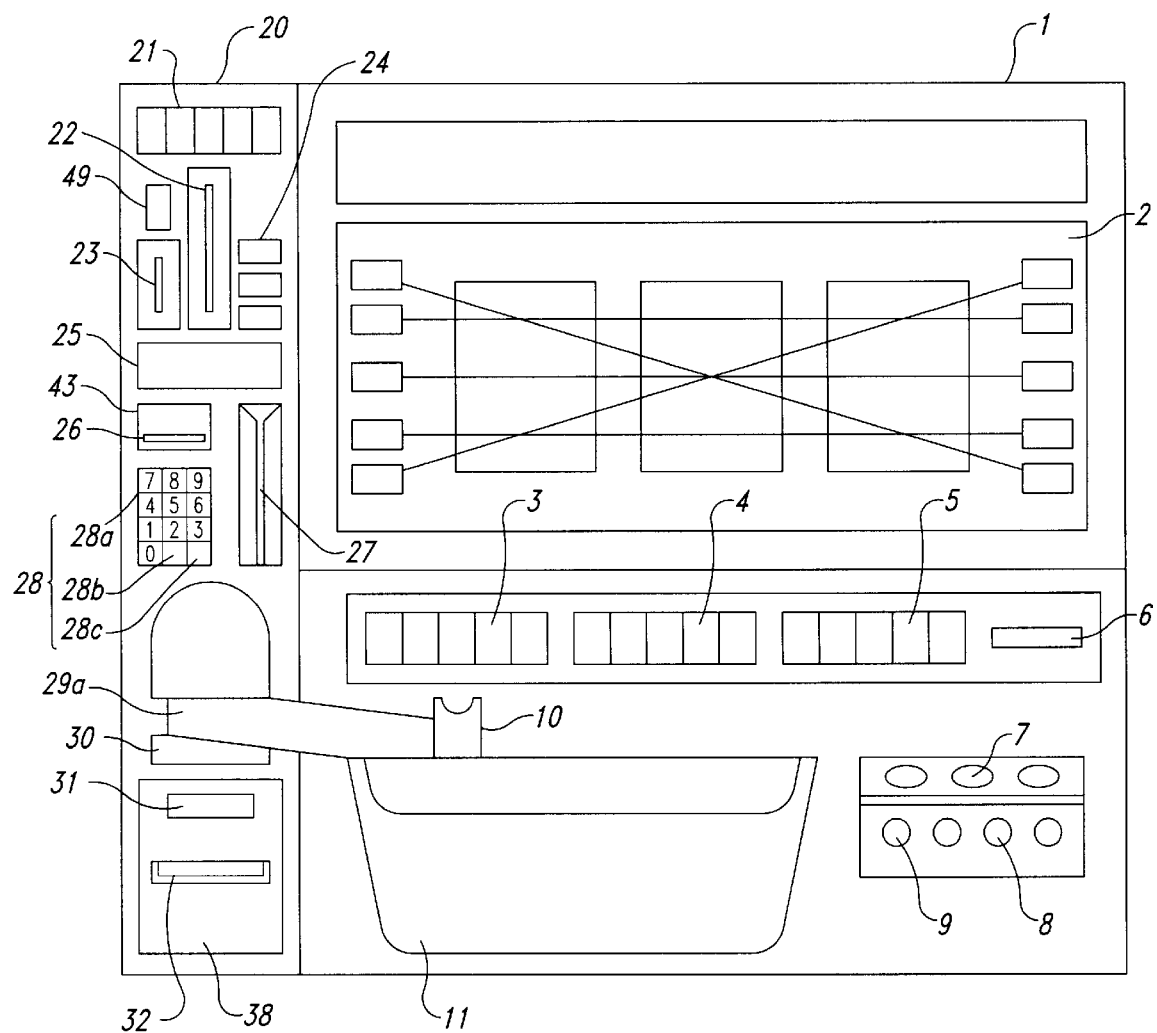
FIG. 6 is a front view showing the modified embodiment of the invention.

The invention is not limited to the embodiment. For example, to check a player who uses a credit card for identification, the fingerprint of the player may be previously stored in his or her credit card for comparing it with the fingerprint of a player to ensure his or her identification. In this fingerprint check system, a credit card 70 as shown in FIG. 5 is provided with a fingerprint pattern storage section 71 for previously storing the fingerprint of the credit card holder in a binary value and a fingerprint check device 49 is attached to a game play media lending machine side as shown in FIG. 6. A player puts his or her finger in a vermilion inkpad or the like and presses the finger against the fingerprint read window of the fingerprint check device 49. The fingerprint check device 49 binarizes the player's fingerprint pressed against the fingerprint read window and compares the player's fingerprint with the fingerprint of the credit card holder by a pattern matching method. That is, whether or not binary data (0 or 1) at one position matches binary data at the corresponding position between the fingerprints is determined. If they match at positions in a predetermined percentage or more in all, it is determined that the two fingerprints match. Information on feature information positions such as end points or branch points of a fingerprint can also be extracted and used for a fingerprint check. If the fingerprint read window is provided with a guide functioning as positioning means for determining the finger position of a player, a fingerprint check of higher precision can be executed. If the fingerprint read window is provided with a wiper for detecting the pressed player's finger leaving and wiping out the vermilion inkpad print on the fingerprint read window, the fingerprint read window can be kept clean and a fingerprint check of higher precision can be executed. The credit card in the system must be an IC card because a large amount of image data is stored.

For example, as shown in FIG. 6, a game play media dispensing chute 29a may be located in place of the game play media dispensing port 29 so as to dispense game play media directly to the game play media slot 10 of the gaming machine 1.

I claim:

1. A game play media lending machine which enables a player to use a credit card for lending game play media, comprising:

game play media dispensing means for accepting a request for dispensing game play media and dispensing game play media in response to the number of game play media to be dispensed corresponding to a specified dispensing amount of money;

a credit card reader for reading information registered on a credit card containing identification data;

identification information input means for inputting identification information to be compared with the identification data;

amount setting means for setting a lending amount of money spent for a player to play a game for an inserted credit card;

control means for determining whether or not the identification information input through said identification information input means matches the identification data read by said credit said credit card reader, if they match, said control means for causing said game play media dispensing means to dispense game play media within the range of the lending amount set through said amount setting means;

means for storing the credit card identification information and the lending amount; and means for issuing a lending card on which at least the lending amount is entered when the lending amount is set through said amount setting means, wherein
   the identification data has binary information on a fingerprint as the feature information indicating the feature of the player who holds the credit card, wherein
   said identification information input means is means for extracting a fingerprint of the player and binarizing it as the feature information of the player, and wherein
   said control means has means for comparing the binary information of the extracted fingerprint with a fingerprint specified by binary information contained in the credit card by a pattern matching method.

2. The game play media lending machine as claimed in claim 1 further including means for transmitting the identification information and the lending amount stored in said storage means to a predetermined specific information processor.

3. A game play media lending machine which enables a player to use a credit card for lending game play media, comprising:

game play media dispensing means for accepting a request for dispensing game play media and dispensing game play media in response to the number of game play media to be dispensed corresponding to a specified dispensing amount of money;

a credit card reader for reading information registered on a credit card containing identification data;

identification information input means for inputting identification information to be compared with the identification data;

amount setting means for setting a lending amount of money spent for a player to play a game for an inserted credit card;

control means for determining whether or not the identification information input through said identification information input means matches the identification data read by said credit card reader, if they match, said control means for causing said game play media dispensing means to dispense game play media within the range of the lending amount set through said amount setting means;

means for storing the credit card identification information and the lending amount;

means for calculating by subtracting the dispensing amount from a remainder, beginning with the setup lending amount as an initial remainder, each time a dispensing request is made, to update said remainder;

means for storing a plurality of adjustment card type recording media; and an issuing machine for taking out the adjustment card type recording media one at a time from said storage means, recording the calculated remainder as a return amount on the adjustment card type recording medium, and issuing it.

4. The game play media lending machine as claimed in claim 3 wherein said issuing machine further includes a card reader for accepting an inserted adjustment card type recording medium, reading the return amount recorded on the adjustment card type recording medium, and outputting it to said control means, and wherein said control means assumes the return amount to be the lending amount range and dispenses game play media within the range.

5. The game play media lending machine as claimed in claim 3 wherein the identification data is a personal identification number and wherein said identification information input means is a key switch.

6. The game play media lending machine as claimed in claim 4 wherein the identification data is a personal identification number and wherein said identification information input means is a key switch.

7. The game play media lending machine as claimed in claim 3 wherein a gaming machine for a player to play a game with game play media lent by said game play media lending machine is adjacent thereto, said gaming machine comprising a mechanism for dispensing game play media for a winning game play, said game play media lending machine further including:
means being informed of the number of game play media dispensed for a winning game play as the number of won game play media from said gaming machine for adding the number of won game play media to the number of game play media having been dispensed for winning game play media and for calculating the cumulative number of won game play media;

first storage means for storing the calculated cumulative number of won game play media; and means for recording the number of won game play media stored in said first storage means on the adjustment card type recording medium at the game end.

8. The game play media lending machine as claimed in claim 7 further including:

means for accepting an inserted adjustment card type recording medium and reading the number of won game play media recorded on the adjustment card type recording medium;

said means being informed of the number of game play media dispensed for a winning game play as the number of won game play media from said gaming machine for adding the number of won game play media to the number of won game play media recorded on the adjustment card type recording medium and for calculating the cumulative number of won game play media;

second storage means for storing the calculated cumulative number of won game play media; and means for recording the number of won game play media stored in said second storage means on the adjustment card type recording medium at the game end.

9. The game play media lending machine as claimed in claim 3 wherein the identification data is a feature information indicating a feature of a player who holds a credit card, and wherein said identification information input means is means for extracting the feature information of the player.

10. The game play media lending machine of claim 3, further comprising means for issuing a lending card on which at least the lending amount is entered when the lending amount is set through said amount setting means.

11. A gaming house management system for managing a gaming house having a plurality of gaming machines for playing games with game play media and a plurality of game play media lending machines for lending the game play media, said system comprising:

a credit data totalizer for totalizing credit data, each of said game play media lending machines comprising:
means for dispensing game play media;
a credit card slot;
a credit card reader for reading information registered on a credit card inserted into said credit card slot containing identification data;
identification information input means for inputting identification information to be compared with the identification data;
amount setting means for setting a lending amount of money for the player to play a game with the inserted credit card;
control means for causing said game play media dispensing means to dispense game play media within the range of the lending amount set through said amount setting means, provided that the identification information input through said identification information input means matches the identification data read by said credit card reader;
means for storing the credit card identification information and the lending amount;
means for transmitting the credit card identification information and the lending amount stored in said storage means to said credit data totalizer; and
means for issuing a house card on which is stored the number of won game play media and the unused portion of said lending amount,
said credit data totalizer for totalizing the lending amount and the identification information for each credit card holder and outputting the result as gaming house data.

12. A game play media lending machine which enables a player to use a credit card for lending game play media, comprising:

game play media dispensing means for accepting a request for dispensing game play media and dispensing game play media in response to the number of game play media to be dispensed corresponding to a specified dispensing amount of money;

a credit card reader for reading information registered on a credit card containing identification data;

identification information input means for inputting identification information to be compared with the identification data;

amount setting means for setting a lending amount of money spent for a player to play a game for an inserted credit card;

control means for determining whether or not the identification information input through said identification information input means matches the identification data read by said credit card reader, if they match, said control means for causing said game play media dispensing means to dispense game play media within the range of the lending amount set through said amount setting means;

means for storing the credit card identification information and the lending amount;

means for issuing a lending card on which at least the lending amount is entered when the lending amount is set through said amount setting means;

means for calculating by subtracting the dispensing amount from a remainder, beginning with the setup lending amount as an initial remainder each time a dispensing request is made, to update said remainder;

means for storing a plurality of adjustment card type recording media;

an issuing machine for taking out the adjustment card type recording media one at a time from said storage means, recording the calculated remainder as a return amount on the adjustment card type recording medium, and issuing it;

wherein the identification data is a feature information indicating a feature of a player who holds a credit card;

wherein said identification information input means is means for extracting the feature information of the player;

wherein the feature information of the identification data has binary information on a fingerprint;

wherein said identification information input means is means for extracting a fingerprint of the player and binarizing it; and wherein said control means has means for comparing the binary information of the extracted fingerprint with a fingerprint specified by binary information contained in the credit card by a pattern matching method.

13. A game play media lending machine which enables a player to use a credit card for lending game play media, said lending machine associated with a gaming machine, said lending machine comprising:

game play media dispensing means for accepting a request for dispensing game play media and dispensing game play media in response to the number of game play media to be dispensed corresponding to a specified dispensing amount of money;

a credit card reader for reading information registered on a credit card containing identification data;

identification information input means for inputting identification information to be compared with the identification data;

amount setting means for setting a lending amount of money spent for a player to play a game for an inserted credit card;

control means for determining whether or not the identification information input through said identification information input means matches the identification data read by said credit card reader, if they match, said control means for causing said game play media dispensing means to dispense game play media within the range of the lending amount set through said amount setting means;

means for storing the credit card identification information and the lending amount; and means for issuing a house card on which is stored the number of game play media won from said gaming machine, wherein the identification data has binary information on a fingerprint as the feature information indicating the feature of the player who holds the credit card, wherein said identification information input means is means for extracting a fingerprint of the player and binarizing it as the feature information of the player, and wherein said control means has means for comparing the binary information of the extracted fingerprint with a fingerprint specified by binary information contained in the credit card by a pattern matching method.

* * * * *